(12) United States Patent
Szarek

(10) Patent No.: US 11,279,486 B2
(45) Date of Patent: Mar. 22, 2022

(54) AUXILIARY-POD MOUNTING SYSTEM AND MOUNTING METHODS FOR A HELICOPTER

(71) Applicant: The Boeing Company, Chicago, IL (US)

(72) Inventor: Kenneth A. Szarek, Beaufort, SC (US)

(73) Assignee: The Boeing Company, Chicago, IL (US)

( * ) Notice: Subject to any disclaimer, the term of this patent is extended or adjusted under 35 U.S.C. 154(b) by 443 days.

(21) Appl. No.: 16/359,866

(22) Filed: Mar. 20, 2019

(65) Prior Publication Data

US 2020/0298974 A1 Sep. 24, 2020

(51) Int. Cl.
| | |
|---|---|
| *B64D 9/00* | (2006.01) |
| *B64D 7/00* | (2006.01) |
| *F41F 3/065* | (2006.01) |
| *B64C 27/04* | (2006.01) |
| *F41H 11/02* | (2006.01) |

(52) U.S. Cl.
CPC ............... *B64D 9/00* (2013.01); *B64C 27/04* (2013.01); *B64D 7/00* (2013.01); *F41F 3/065* (2013.01); *F41H 11/02* (2013.01)

(58) Field of Classification Search
CPC ......... B64C 25/02; B64C 25/06; B64C 25/14; B64C 2025/325; B64D 7/00; B64D 7/02; B64D 7/04; B64D 7/06; B64D 7/08; B64D 9/00; F41F 3/065; F41F 3/06
See application file for complete search history.

(56) References Cited

U.S. PATENT DOCUMENTS

| | | | | |
|---|---|---|---|---|
| 2013/0105628 A1* | 5/2013 | Buscher | ............... | B64C 39/024 244/119 |
| 2016/0144954 A1* | 5/2016 | Daigle | .................. | B64C 39/024 244/17.23 |

FOREIGN PATENT DOCUMENTS

CN 209305838 U * 8/2019

OTHER PUBLICATIONS

TSOP Tyler Special Operations Platforms external helicopter benches, https://www.tylertech.net/, accessed Mar. 20, 2019.

* cited by examiner

*Primary Examiner* — Joshua J Michener
*Assistant Examiner* — Cindi M Curry
(74) *Attorney, Agent, or Firm* — Kunzler Bean & Adamson

(57) ABSTRACT

Disclosed herein is an auxiliary-pod mounting system for mounting an auxiliary pod to a landing skid assembly of a helicopter. The landing skid assembly comprises a forward crossbar, a rearward crossbar, and skids coupled to the forward crossbar and the rearward crossbar. The auxiliary-pod mounting system comprises a first rail. The auxiliary-pod mounting system also comprises a second rail, spaced apart from the first rail. The auxiliary-pod mounting system further comprises a mounting plate, interposed between and coupled to the first rail and the second rail. The mounting plate comprises pod engagement features configured to engage the auxiliary pod and to secure the auxiliary pod to the mounting plate. The auxiliary-pod mounting system additionally comprises a plurality of brackets configured to couple the first rail and the second rail to the forward crossbar and the rearward crossbar of the landing skid assembly of the helicopter.

20 Claims, 11 Drawing Sheets

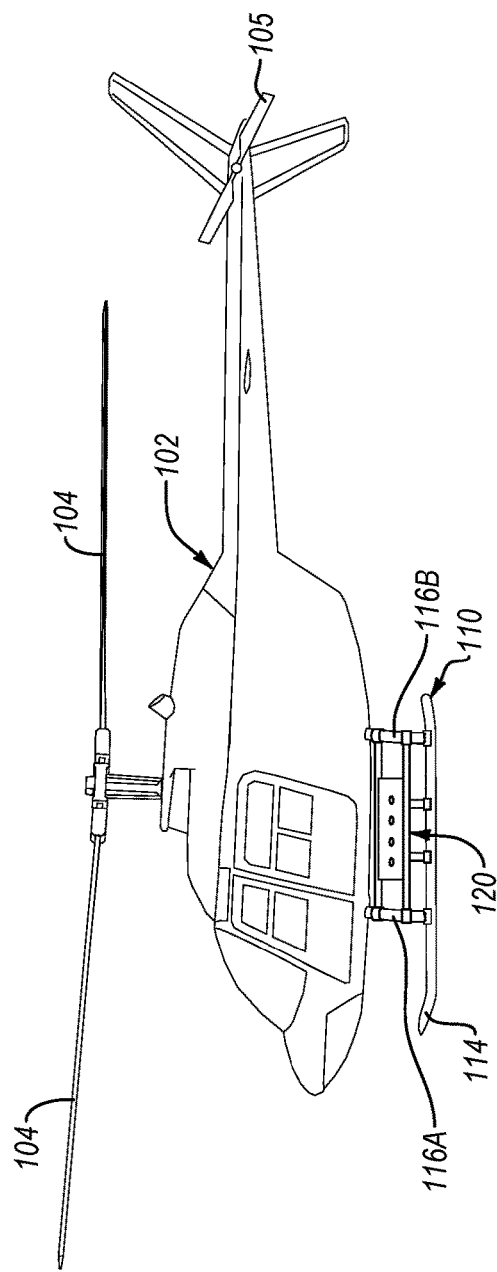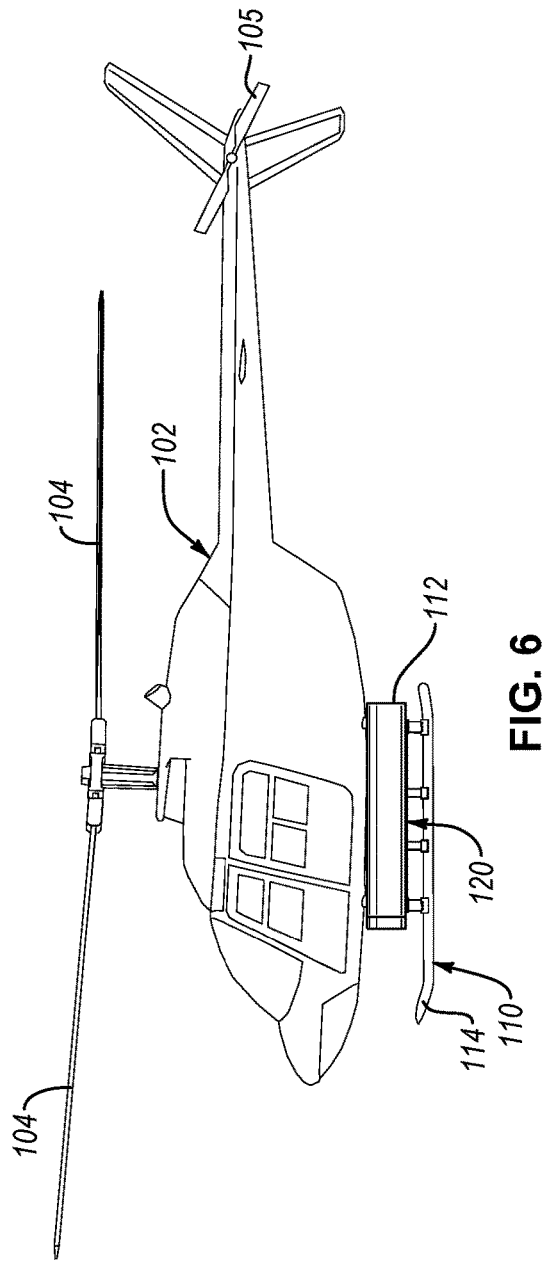

AUXILIARY-POD MOUNTING SYSTEM AND MOUNTING METHODS FOR A HELICOPTER

FIELD

This disclosure relates generally to helicopters, and more particularly to mounting auxiliary pods to helicopters.

BACKGROUND

Auxiliary pods can be externally attached to helicopters to help add functionality, range, and customization to an existing helicopter. Typically, auxiliary pods are attached directly to the body or to stub wings extending from the body. Because external space, useable for auxiliary pods, around the body of a helicopter is limited, mounting primary or supplemental auxiliary pods to a helicopter can be difficult.

SUMMARY

The subject matter of the present application has been developed in response to the present state of the art, and in particular, in response to the shortcomings of helicopters and the capacity to mount auxiliary pods thereto, that have not yet been fully solved by currently available techniques. Accordingly, the subject matter of the present application has been developed to provide an auxiliary-pod mounting system for helicopters, and corresponding methods, that overcome at least some of the above-discussed shortcomings of prior art techniques.

The following is a non-exhaustive list of examples, which may or may not be claimed, of the subject matter, disclosed herein.

Disclosed herein is an auxiliary-pod mounting system for mounting an auxiliary pod to a landing skid assembly of a helicopter. The landing skid assembly comprises a forward crossbar, a rearward crossbar, and skids coupled to the forward crossbar and the rearward crossbar. The auxiliary-pod mounting system comprises a first rail. The auxiliary-pod mounting system also comprises a second rail, spaced apart from the first rail. The auxiliary-pod mounting system further comprises a mounting plate, interposed between and coupled to the first rail and the second rail. The mounting plate comprises pod engagement features configured to engage the auxiliary pod and to secure the auxiliary pod to the mounting plate. The auxiliary-pod mounting system additionally comprises a plurality of brackets configured to couple the first rail and the second rail to the forward crossbar and the rearward crossbar of the landing skid assembly of the helicopter. The preceding subject matter of this paragraph characterizes example 1 of the present disclosure.

The auxiliary pod comprises lugs, spaced apart from each other by a first distance. The pod engagement features of the mounting plate comprise apertures, spaced apart from each other by the first distance and configured to receive the lugs of the auxiliary pod. The preceding subject matter of this paragraph characterizes example 2 of the present disclosure, wherein example 2 also includes the subject matter according to example 1, above.

The apertures comprise a pair of first apertures spaced apart from each other by the first distance. The apertures further comprise a pair of second apertures spaced apart from each other by a second distance, different than the first distance. The pair of second apertures are configured to receive lugs of a second auxiliary pod. The lugs of the second auxiliary pod are spaced apart from each other by the second distance. The preceding subject matter of this paragraph characterizes example 3 of the present disclosure, wherein example 3 also includes the subject matter according to example 2, above.

The system further comprises a spacer, coupled to the second rail, positionable between the second rail and one of the skids, and configured to maintain an adjustable distance between the second rail and the one of the skids when the first rail and the second rail are coupled to the forward crossbar and the rearward crossbar by the plurality of brackets. The preceding subject matter of this paragraph characterizes example 4 of the present disclosure, wherein example 4 also includes the subject matter according to any one of examples 1-3, above.

The system further comprises anti-sway braces, coupled to the mounting plate and each configured to engage a corresponding one of opposing sides of the auxiliary pod. The preceding subject matter of this paragraph characterizes example 5 of the present disclosure, wherein example 5 also includes the subject matter according to any one of examples 1-4, above.

The anti-sway braces are adjustable to adjust a distance the anti-sway braces extend from the mounting plate. The preceding subject matter of this paragraph characterizes example 6 of the present disclosure, wherein example 6 also includes the subject matter according to example 5, above.

The anti-sway braces comprise multiple pairs of anti-sway braces, spaced apart from each other along the mounting plate. The preceding subject matter of this paragraph characterizes example 7 of the present disclosure, wherein example 7 also includes the subject matter according to any one of examples 5-6, above.

Each one of the brackets is configured to releasably clamp onto one of the forward crossbar or the rearward crossbar. The preceding subject matter of this paragraph characterizes example 8 of the present disclosure, wherein example 8 also includes the subject matter according to any one of examples 1-7, above.

The mounting plate comprises a flat mounting surface. The auxiliary pod is engaged against the flat mounting surface when the auxiliary pod is secured to the mounting plate. The preceding subject matter of this paragraph characterizes example 9 of the present disclosure, wherein example 9 also includes the subject matter according to any one of examples 1-8, above.

The mounting plate comprises a contoured mounting surface. A contour of the contoured mounting surface complements a contour of the auxiliary pod. The auxiliary pod is engaged against the contoured mounting surface when the auxiliary pod is secured to the mounting plate. The preceding subject matter of this paragraph characterizes example 10 of the present disclosure, wherein example 10 also includes the subject matter according to any one of examples 1-9, above.

The mounting plate is configured such that, when the first rail and the second rail are coupled to the forward crossbar and the rearward crossbar of the landing skid assembly of the helicopter by the plurality of brackets, an entirety of the mounting plate is interposed between the forward crossbar and the rearward crossbar. The preceding subject matter of this paragraph characterizes example 11 of the present disclosure, wherein example 11 also includes the subject matter according to any one of examples 1-10, above.

The mounting plate comprises a first mounting surface and a second mounting surface, opposite the first mounting surface. When the first rail and the second rail are coupled to the forward crossbar and the rearward crossbar of the landing skid assembly of the helicopter by the plurality of brackets, the first mounting surface faces outwardly relative to the helicopter and the second mounting surface faces inwardly relative to the helicopter. The pod engagement features are configured to engage the auxiliary pod with the auxiliary pod above the forward crossbar and the rearward crossbar or below the forward crossbar and the rearward crossbar and to secure the auxiliary pod against either the first mounting surface or the second mounting surface. The preceding subject matter of this paragraph characterizes example 12 of the present disclosure, wherein example 12 also includes the subject matter according to any one of examples 1-11, above.

The first mounting surface and the second mounting surface are flat. The preceding subject matter of this paragraph characterizes example 13 of the present disclosure, wherein example 13 also includes the subject matter according to example 12, above.

The first mounting surface and the second mounting surface are contoured. The preceding subject matter of this paragraph characterizes example 14 of the present disclosure, wherein example 14 also includes the subject matter according to example 12, above.

Further disclosed herein is a helicopter. The helicopter comprises a body. The helicopter also comprises rotors, rotatably coupled to the body at a top portion of the body. The helicopter further comprises a landing skid assembly, fixedly coupled to the body at a bottom portion of the body. The landing skid assembly comprises a forward crossbar, a rearward crossbar, and skids coupled to the forward crossbar and the rearward crossbar. The helicopter additionally comprises auxiliary-pod mounting systems, each coupled to the forward crossbar and the rearward crossbar between a corresponding one of the skids and the body. The helicopter also comprises a first auxiliary pod secured to one of the auxiliary-pod mounting systems. The helicopter further comprises one of a second auxiliary pod or a counterweight secured to an other one of the auxiliary-pod mounting system. The preceding subject matter of this paragraph characterizes example 15 of the present disclosure.

The second auxiliary pod is secured to the other one of the auxiliary-pod mounting systems. The preceding subject matter of this paragraph characterizes example 16 of the present disclosure, wherein example 16 also includes the subject matter according to example 15, above.

The counterweight is secured to the other one of the auxiliary-pod mounting systems. The preceding subject matter of this paragraph characterizes example 17 of the present disclosure, wherein example 17 also includes the subject matter according to example 15, above.

Each one of the auxiliary-pod mounting systems comprises a first rail. Each one of the auxiliary-pod mounting systems also comprises a second rail, spaced apart from the first rail. Each one of the auxiliary-pod mounting systems further comprises a mounting plate, interposed between and coupled to the first rail and the second rail. The mounting plate comprises pod engagement features configured to engage a corresponding one of the first auxiliary pod or the one of the second auxiliary pod or the counterweight to secure the corresponding one of the first auxiliary pod or the one of the second auxiliary pod or the counterweight to the mounting plate. Each one of the auxiliary-pod mounting systems also comprises a plurality of brackets configured to couple the first rail and the second rail to the forward crossbar and the rearward crossbar of the landing skid assembly of the helicopter. The preceding subject matter of this paragraph characterizes example 18 of the present disclosure, wherein example 18 also includes the subject matter according to any one of examples 15-17, above.

Additionally disclosed herein is a method of mounting an auxiliary pod to a helicopter. The method comprises releasably securing a first auxiliary-pod mounting system to a forward crossbar and a rearward crossbar, of a landing skid assembly of the helicopter, between a body of the helicopter and one of two skids of the landing skid assembly. The method also comprises releasably securing a second auxiliary-pod mounting system to the forward crossbar and the rearward crossbar, of the landing skid assembly of the helicopter, between the body of the helicopter and an other one of the two skids of the landing skid assembly. The method further comprises releasably securing a first auxiliary pod to the first auxiliary-pod mounting system. The method additionally comprises releasably securing a second auxiliary pod or a counterweight to the second auxiliary-pod mounting system. The preceding subject matter of this paragraph characterizes example 19 of the present disclosure.

The method further comprises removing the first auxiliary pod from the first auxiliary-pod mounting system. The method also comprises releasably securing a third auxiliary pod to the first auxiliary-pod mounting system in place of the first auxiliary pod. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which:

FIG. 5 is a side view of a helicopter, without an auxiliary pod, according to one or more examples of the present disclosure;

FIG. 6 is a side view of the helicopter of FIG. 4, with an auxiliary pod coupled to a landing skid assembly of the helicopter, according to one or more examples of the present disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The subject matter of the present application discloses an auxiliary-pod mounting system that facilitates coupling of an auxiliary pod to the landing skid assembly of a helicopter. Auxiliary pods can be externally attached to helicopters to help add functionality, range, and customization to an existing helicopter. Typically, auxiliary pods are attached directly to the body or to stub wings extending from the body. Generally, the space immediately adjacent the landing skid assembly of a helicopter is unused or unoccupied. Because external space, useable for auxiliary pods, around the body of a helicopter is limited, utilizing the unoccupied space around the landing skid assembly for attachment of auxiliary pods helps to increase the helicopter's capacity for receiving auxiliary pods and thus helps increase the functionality, range, and customization of the helicopter compared to traditional approaches.

As used herein, a helicopter can be any of various rotorcraft, such as autogyros, gyrodynes, and the like, that use landing skid assemblies for supporting the rotocraft on the ground when not in flight. Accordingly, although the present disclosure most often refers to helicopters, it is recognized that references to helicopters can be interchanged with other types of rotorcraft that have a landing skid assembly as described herein.

Figure 1:
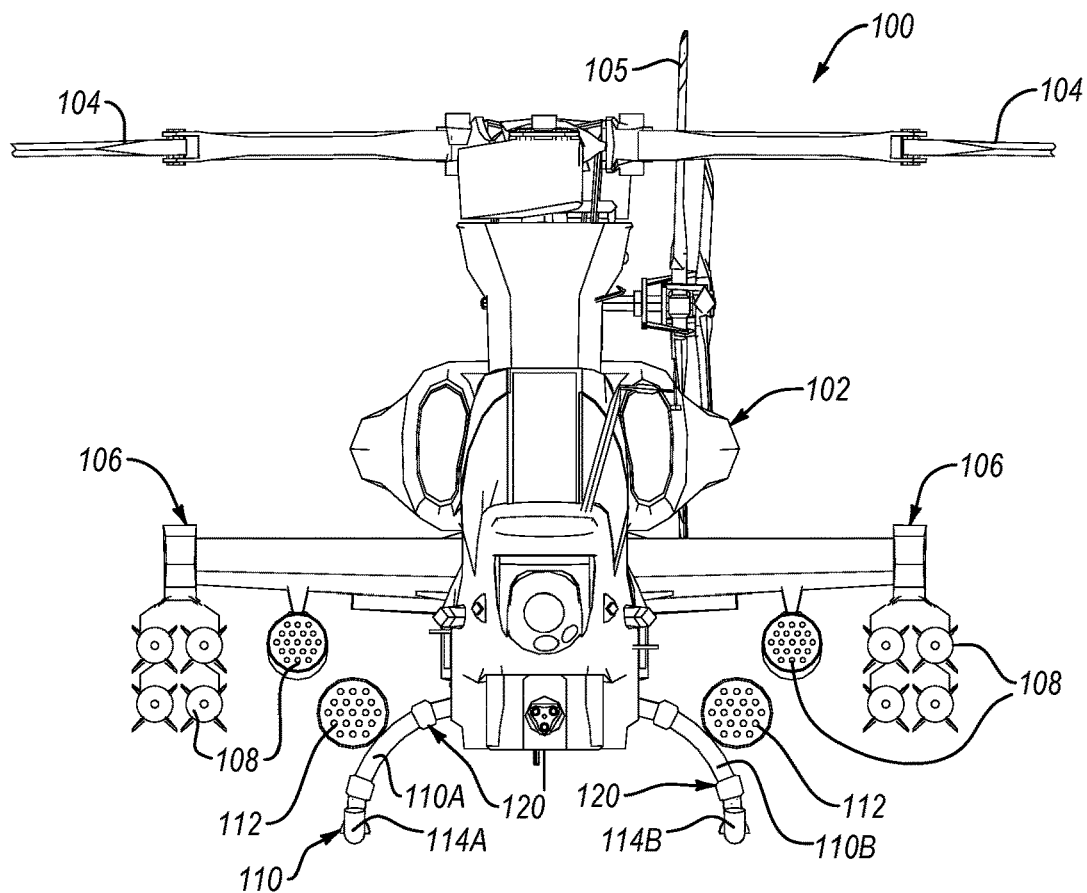
FIG. 1 is a front view of a helicopter, with auxiliary pods in a first configuration, according to one or more examples of the present disclosure.
Figure 2:
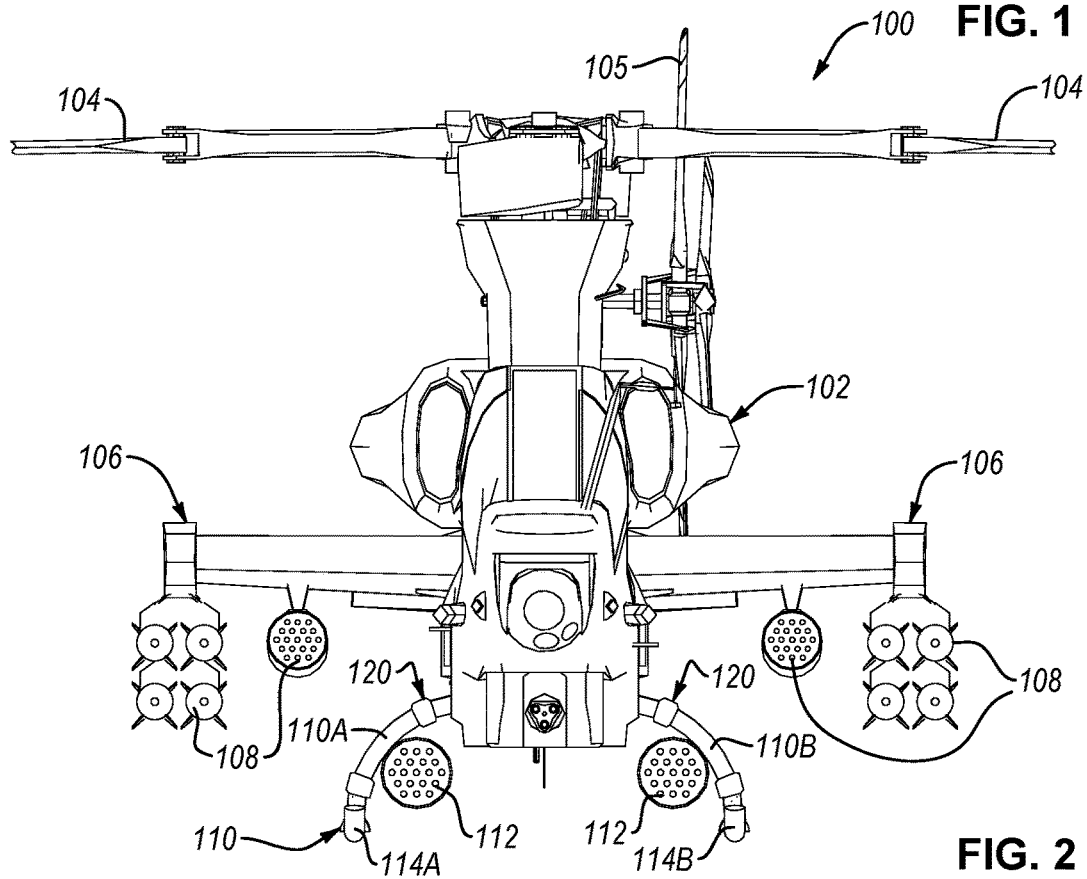
FIG. 2 is a front view of the helicopter of FIG. 1, with auxiliary pods in a second configuration, according to one or more examples of the present disclosure.

Referring to FIGS. 1 and 2, one example of a helicopter 100 is shown. The helicopter 100 includes a body 102 and rotors 104 that are rotatably coupled to the body 102. The rotors 104 are rotatably coupled to the body 102 by a rotational power generator, such as a combustion engine, jet engine, or electric motor. The rotors 104 are rotatably coupled to a top portion of the body 102. Additionally, the helicopter 100 includes tail rotors 105 that are rotatably coupled to the body 102 at a distal end of a tail of the body 102. The helicopter 100 further includes a landing skid assembly 110 fixedly coupled to the body 102 at a bottom portion of the body 102. The helicopter 100 of FIGS. 1 and 2 additionally includes stub wings 106 or armament platforms each coupled to and protruding from a corresponding one of opposite sides of the body 102. The stub wings 106 are configured to receive and support one or more auxiliary pods 108. More specifically, in some examples, the helicopter 100 includes auxiliary pods 108 each releasably securable to one of the stub wings 106. In the illustrated example of FIGS. 1 and 2, the helicopter 100 is an attack helicopter and the auxiliary pods 108 are armament pods containing any of various armaments or weapons, such as electronic weapons, chemical weapons, ballistic weapons, and the like. However, in other examples, the auxiliary pods 108 of the helicopter 100 of FIGS. 1 and 2 are non-armament pods, such as communication pods, fuel pods, sensor pods, reconnaissance pods, and the like. As used herein, auxiliary pods include suspension stations, stores, and the like.

The helicopter 100 additionally includes auxiliary-pod mounting systems 120 each coupled to a corresponding one of a right side 110A of the landing skid assembly 110 and a left side 110B of the landing skid assembly 110. The right side 110A of the landing skid assembly 110 is the portion of the landing skid assembly 110 protruding from the right side of the body 102. Similarly, the left side 110B of the landing skid assembly 110 is the portion of the landing skid assembly 110 protruding from the left side of the body 102. Each of the right side 110A and the left side 110B of the landing skid assembly 110 protrudes outwardly and downwardly away from the body 102. The right side 110A includes a right skid 114A of the landing skid assembly 110 and the left side 110B includes a left skid 114B of the landing skid assembly 110. The auxiliary-pod mounting system 120 on the right side 110A of the landing skid assembly 110 is interposed between the right skid 114A and the body 102 and the auxiliary-pod mounting system 120 on the left side 110B of the landing skid assembly 110 is interposed between the left skid 114B and the body 102.

In addition to the auxiliary pods 108, the helicopter 100 of FIGS. 1 and 2 includes auxiliary pods 112 each coupled to a corresponding one of the auxiliary-pod mounting systems 120. Accordingly, each one of the auxiliary pods 112 is located between the body 102 and a corresponding one of the right skid 114A and the left skid 114B. Each one of the auxiliary-pod mounting systems 120 is configured such that an auxiliary pod 112 can be mounted to an auxiliary-pod mounting system 120 in an upper configuration (see, e.g., FIG. 1) or a lower configuration (see, e.g., FIG. 2). In the upper configuration, the auxiliary pod 112 is, in effect, above the landing skid assembly 110 and in the lower configuration, the auxiliary pod 112 is, in effect, below the landing skid assembly 110. Both of the auxiliary pods 112 can be mounted in either the upper configuration or the lower configuration depending on any of various factors, such as the type and quantity of the auxiliary pods 108, the size and/or shape of the auxiliary pods 112, and the like. As used herein, an auxiliary pods can be supplemental (additional) pods, supplementing other pods on a helicopter, or primary pods, acting as the only pods on the helicopter. Accordingly, the term auxiliary is used merely to connote that the pods are external to the body 102 of the helicopter 100 and not necessarily that the pods supplement other pods of the helicopter.

Figure 3:
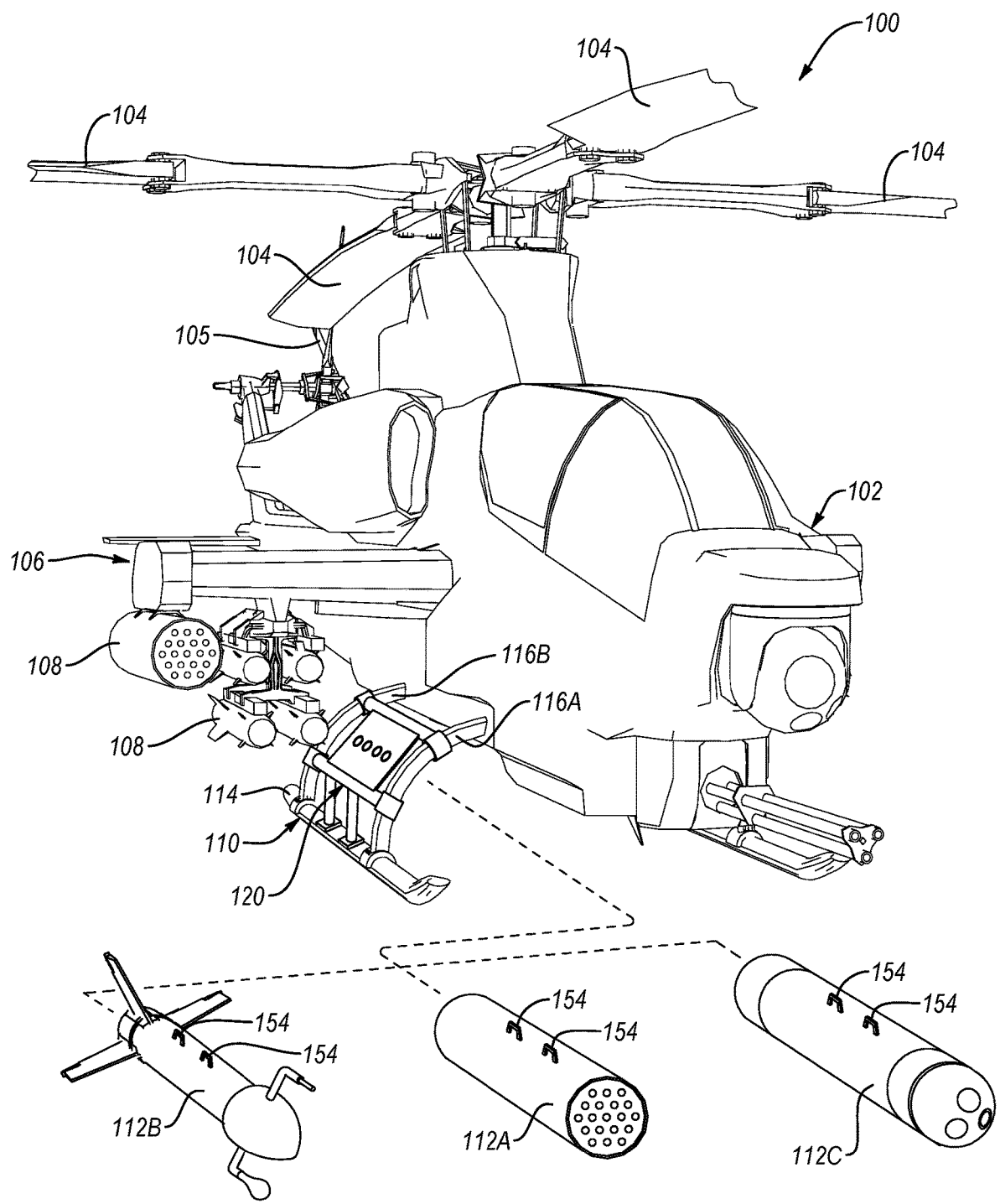
FIG. 3 is a perspective view of a helicopter and a plurality of different auxiliary pods, according to one or more examples of the present disclosure.
Figure 4:
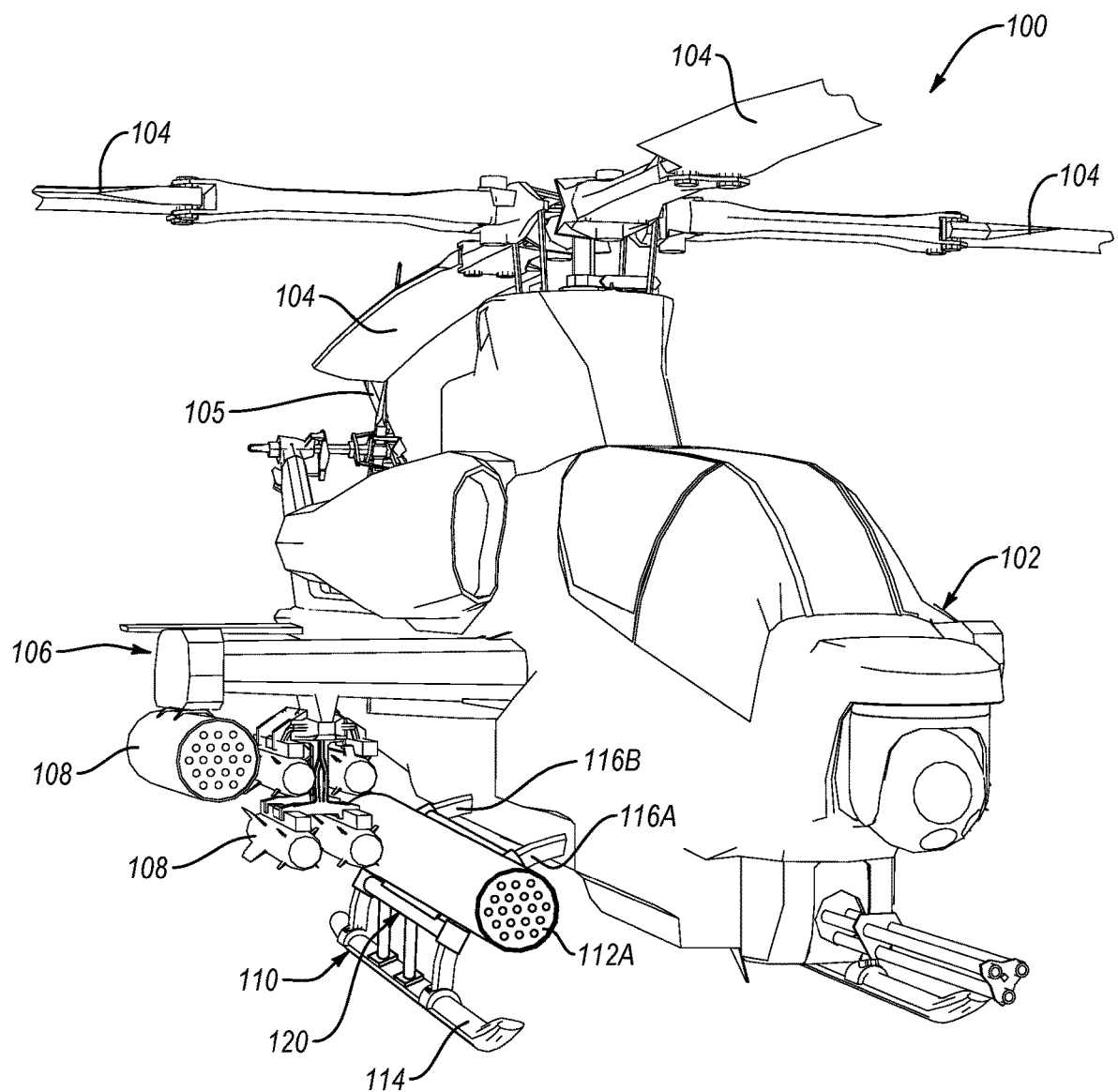
FIG. 4 is a perspective view of the helicopter of FIG. 3, with one of the plurality of different auxiliary pods coupled to a landing skid assembly of the helicopter, according to one or more examples of the present disclosure.

Referring to FIGS. 3 and 4, in some examples of the helicopter 100, each auxiliary-pod mounting system 120 is configured to mountably receive any one of multiple types of auxiliary pods 112. In other words, the auxiliary-pod mounting system 120 acts as a universal mount to which auxiliary pods 112 of different types, configurations, or uses can be mounted. For example, the auxiliary-pod mounting system 120 is capable of mountably receiving any one of a first auxiliary pod 112A, a second auxiliary pod 112B, or a third auxiliary pod 112C. In the illustrated example, the first auxiliary pod 112A is an armament pod, operable to launch multiple rockets, the second auxiliary pod 112B is an electronic countermeasure (ECM) pod, operable to deceive radar, sonar, or other detection systems employed by an enemy, and the third auxiliary pod 112C is a reconnaissance pod, operable to perform reconnaissance operations.

The first auxiliary pod 112A, the second auxiliary pod 112B, and the third auxiliary pod 112C, while different in functionality, all include a common mounting configuration. The common mounting configuration allows the different pods to be interchangeably releasably mounted to the auxiliary-pod mounting system 120. As shown, in one example, the common mounting configuration includes a pair of spaced-apart mounting lugs 154. Although three different auxiliary pods are shown in FIG. 3, in some examples, any two or more than three different auxiliary pods are interchangeably mountable to the auxiliary-pod mounting system 120.

Referring to FIGS. 5 and 6, the helicopter 100 is a civilian or commercial helicopter without body-mounted auxiliary pods, such as the auxiliary pods 108 of the helicopter 100 of FIGS. 1-4. In other words, the helicopter 100 of FIGS. 5 and 6 does not include an auxiliary pod mount, such as stub wings, extending from the body 102. However, like the helicopter 100 of FIGS. 1-4, the helicopter 100 of FIGS. 5 and 6 includes a body 102, rotors 104, tail rotors 105, and a landing skid assembly 110. Moreover, coupled to the landing skid assembly 110, on each side of the landing skid assembly 110, is an auxiliary-pod mounting system 120. Referring to FIG. 5, as will be explained in detail below, each auxiliary-pod mounting system 120 is secured to a forward crossbar 116A and a rearward crossbar 116B of the landing skid assembly 110 of the helicopter 100. As shown in FIG. 6, an auxiliary pod 112 is mounted to the left side of the landing skid assembly 110 via the auxiliary-pod mounting system 120, such that the auxiliary pod 112 is interposed between the body 102 and a skid 114 of the landing skid assembly 110. Although not shown, another auxiliary pod 112, or counterweight(s), is mounted to the right side of the landing ski assembly 110 via another auxiliary-pod mounting system 120.

Figure 7:
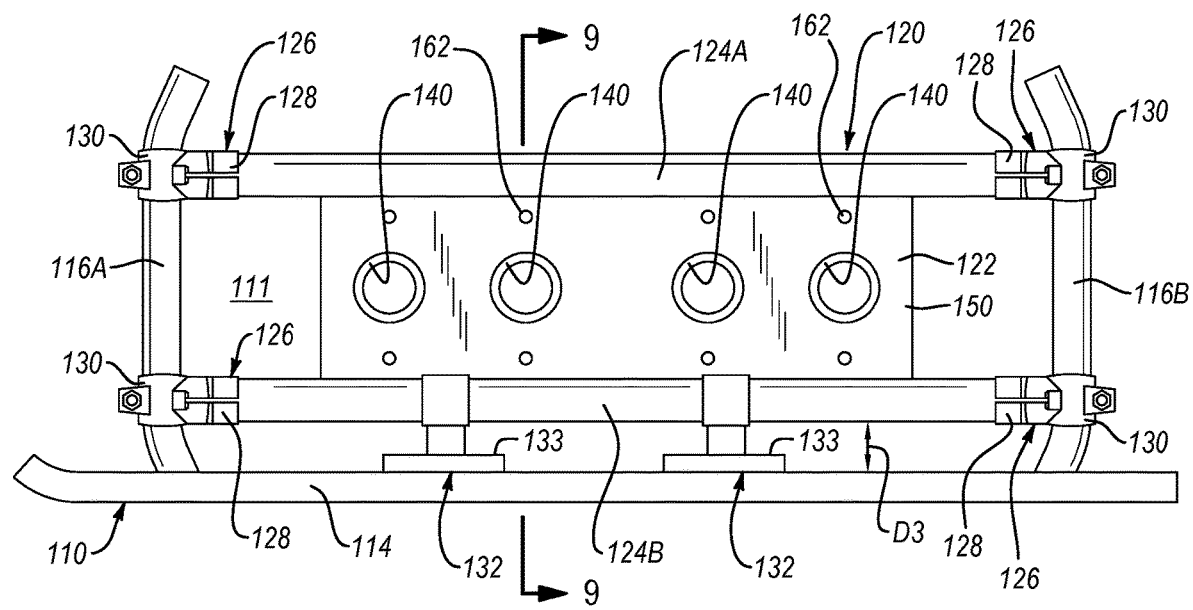
FIG. 7 is a side view of an auxiliary-pod mounting system coupled to a landing skid assembly of a helicopter, according to one or more examples of the present disclosure.
Figure 9:
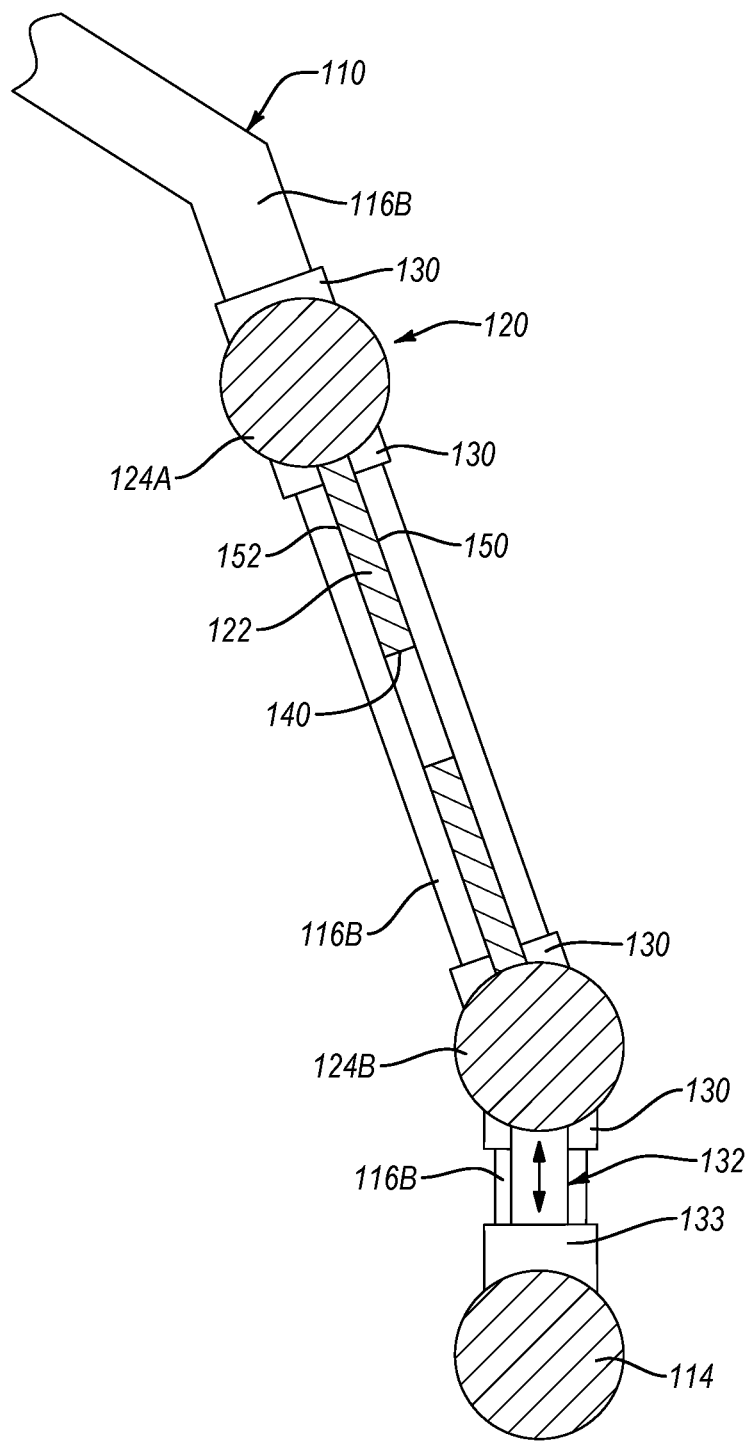
FIG. 9 is a cross-sectional front view of a landing skid assembly and auxiliary-pod mounting system, taken along the line 9-9 of FIG. 7, according to one or more examples of the present disclosure.

Now referring to FIGS. 7 and 9, an auxiliary-pod mounting system 120, according to some examples, is shown coupled to one side of a landing skid assembly 110. The landing skid assembly 110 includes a forward crossbar 116A and a rearward crossbar 116B. The forward crossbar 116A and the rearward crossbar 116B are spaced apart along a length of the body 102 of a helicopter 100. Additionally, the forward crossbar 116A and the rearward crossbar 116B extend outwardly and downwardly away from the body 102 on each side of the body 102. In one example, the forward crossbar 116A is a single, continuous, crossbar that extends from one side of the landing skid assembly 110 through, or along, the body 102 to the opposite side of the landing skid assembly 110 (see, e.g., FIG. 13). Similarly, in one example, the rearward crossbar 116B is a single, continuous, crossbar that extends from one side of the landing skid assembly 110 through, or along, the body 102 to the opposite side of the landing skid assembly 110. However, in other examples, one or both of the forward crossbar 116A and the rearward crossbar 116B is a multi-piece, discontinuous, crossbar. For example, the landing skid assembly 110 can include one forward or rearward crossbar on one side of the body 102 and another, separate, forward or rearward crossbar on the opposite side of the body 102. The crossbars of the landing skid assembly 110 are hollow tubes or solid bars and can have any of various cross-sectional shapes, such as circular, square, rectangular, ovular, triangular, and the like.

Figure 8:
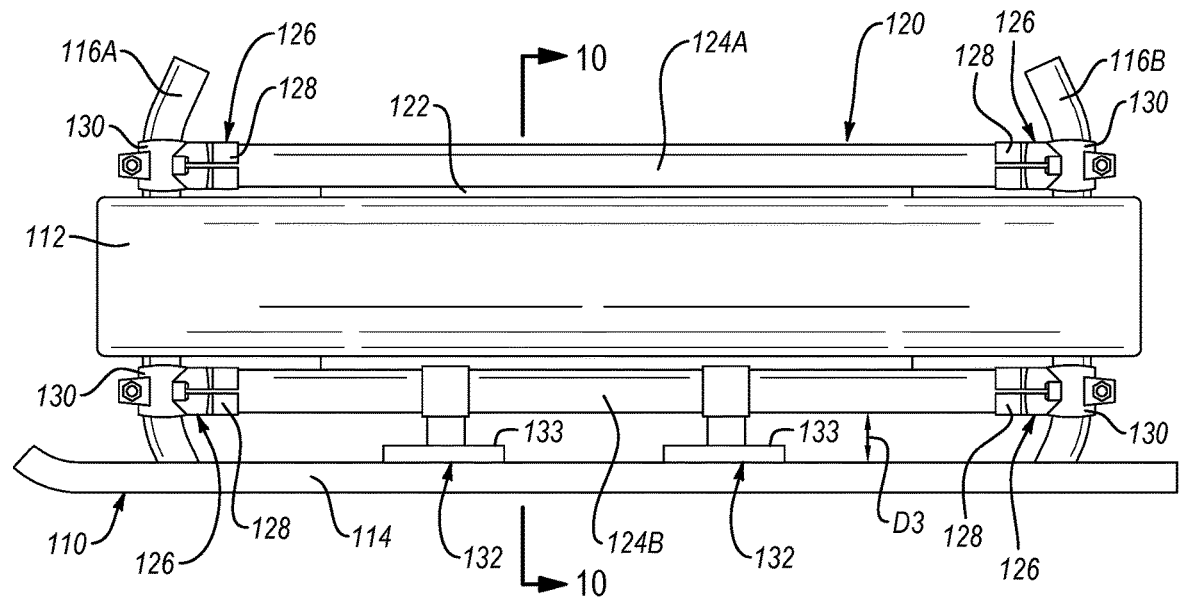
FIG. 8 is a side view of the auxiliary-pod mounting system and the landing skid assembly of FIG. 7, with an auxiliary pod coupled to the auxiliary-pod mounting system, according to one or more examples of the present disclosure.

Each side of the crossbars of the landing skid assembly 110 extend from a proximal end, at the body 102, to a distal end, away from the body 102. The crossbars can be entirely straight, partially curved, or partially bent between the proximal end to the distal end. The landing skid assembly 110 further includes skids 114 each coupled to the distal ends of the crossbars on respective sides of the landing skid assembly 110. On each side of the landing skid assembly 110, a skid assembly space 111 is defined between the body 102, the forward crossbar 116A, the rearward crossbar 116B, and the skid 114. The skids 114 are fixed secured (e.g., fastened or welded) to the crossbars and the crossbars are fixedly secured to the body 102. The skid 114 is a mostly linear and elongated platform or footing that is generally parallel to a length of the body 102 and configured to engage a ground surface during landings or prior to take-offs. In some examples, such as shown in FIGS. 7 and 8, a leading edge and/or a trailing edge of the skid 114 can be uprightly angled.

The description of FIGS. 7 and 9 will proceed with reference to the auxiliary-pod mounting system 120 on one side of the landing skid assembly 110. However, it is recognized that the description of the auxiliary-pod mounting system 120 on one side of the landing skid assembly 110 applies equally to the auxiliary-pod mounting system on the opposite side of the landing skid assembly 110.

The auxiliary-pod mounting system 120 includes a first rail 124A and a second rail 124B. The first rail 124A is spaced apart from the second rail 124B. In some examples, the first rail 124A and the second rail 124B are parallel to each other. Each of the first rail 124A and the second rail 124B is an elongated hollow or solid rigid tubing. The first rail 124A and the second rail 124B can have any of various cross-sectional shapes, such as circular (as shown), rectangular, square, triangular, polygonal, and the like.

Figure 12:
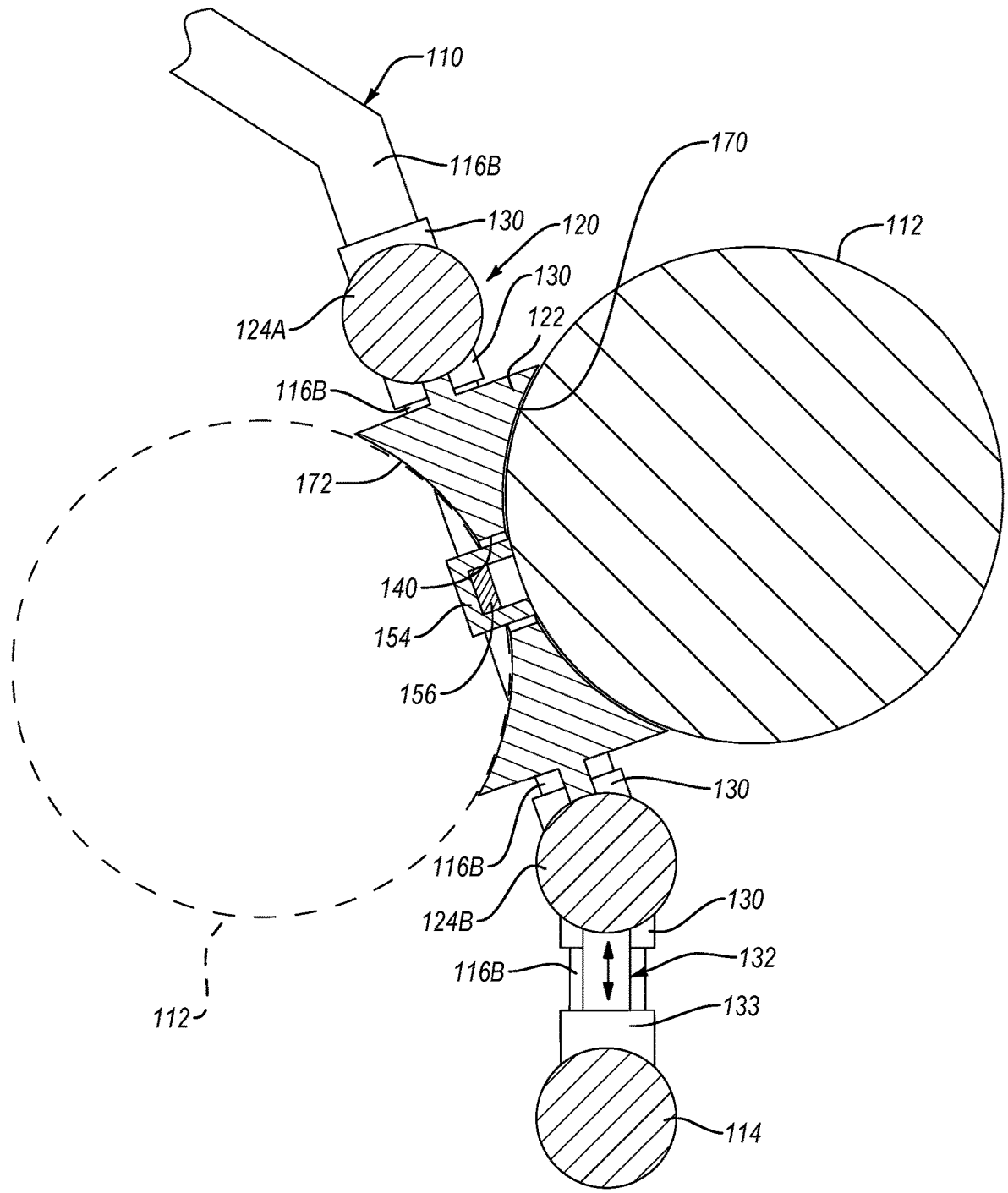
FIG. 12 is a cross-sectional front view of a landing skid assembly and auxiliary-pod mounting system of a helicopter, with an auxiliary pod coupled to the auxiliary-pod mounting system, taken along a line similar to the line 10-10 of FIG. 8, according to one or more examples of the present disclosure.

The auxiliary-pod mounting system 120 further includes a mounting plate 122 interposed between and coupled to the first rail 124A and the second rail 124B. The mounting plate 122 includes a first mounting surface 150 and a second mounting surface 152 that is opposite the first mounting surface 150. In one example, the first mounting surface 150 and the second mounting surface 152 are flat. However, in other examples, such as shown in FIG. 12, the first and second mounting surfaces can be non-flat or contoured. Generally, the mounting plate 122 has a thickness, defined as the distance between the first mounting surface 150 and the second mounting surface 152, that is less than a length and width of the mounting plate 122. The length of the mounting plate 122 is less than a distance between the forward crossbar 116A and the rearward crossbar 116B, which allows an entirety of the mounting plate 122 to fit within the skid assembly space 111 between the forward crossbar 116A and the rearward crossbar 116B.

In one example, the mounting plate 122 is coupled to the first rail 124A and the second rail 124B by separately forming the mounting plate 122 and attaching (e.g., via welding, fastening, bonding, etc.) the mounting plate 122 to the first rail 124A and the second rail 124B. In another example, the mounting plate 122 is coupled to the first rail 124A and the second rail 124B by co-forming the mounting plate 122 with the first rail 124A and the second rail 124B, such that the mounting plate 122, the first rail 124A, and the second rail 124B form one-piece monolithic construction. Accordingly, in certain examples, the first rail 124A and the second rail 124B can be integrated into the mounting plate 122 and be indistinguishable from the mounting plate 122.

The mounting plate 122 includes pod engagement features configured to facilitate secure engagement of an auxiliary pod 112 with the mounting plate 122. In some examples, the pod engagement features are apertures 140 formed in the mounting plate 122. The apertures 140 are through-apertures that extend from the first mounting surface 150 to the second mounting surface 152.

The apertures are configured to receive a corresponding lug 154 of an auxiliary pod 112. Accordingly, the apertures 140 are spaced apart from each other a set distance that corresponds with the distance between lugs 154 of the auxiliary pod 112. For example, two of the apertures 140 are spaced a distance D1 apart from each other for accommodating mounting of an auxiliary pod 112 having a pair of lugs 154 spaced the first distance D1 apart from each other. Similarly, in one example, two of the apertures 140 are spaced a second distance D2 apart from each other for accommodating mounting of an auxiliary pod 112 having a pair of lugs 154 spaced the second distance D2 apart from each other, where the second distance D2 is different than the first distance D1.

According to one example, the mounting plate 122 has only one pair of apertures 140 with that pair of apertures 140 being spaced one of the first distance D1 or the second distance D2 apart from each other. However, in other examples, such as shown in FIG. 7, the mounting plate 122 includes four apertures 140 grouped into a first pair of apertures, spaced the first distance D1 apart from each other, and a second pair of apertures, spaced the second distance D2 apart from each other. The first pair of apertures would be used to receive the lugs 154, spaced the first distance apart D1, of a first auxiliary pod 112, and the second pair of apertures would be used to receive the lugs 154, spaced the second distance apart D2, of a second auxiliary pod 112. Although the first distance D1 and the second distance D2 can be any of various distances, in one example, the first distance D1 is fourteen inches and the second distance D2 is thirty inches. Additionally, although the illustrated example of the mounting plate 122 includes two pairs of apertures 140, in other examples, the mounting plate 122 can include three or more pairs of apertures 140 for accommodating even more auxiliary pod configurations.

The auxiliary-pod mounting system 120 additionally includes brackets 126 that facilitate coupling of the mounting plate 122 to the landing skid assembly 110. In the illustrated example, each bracket 126 is attached to a respective one of two ends of one of the first rail 124A or the second rail 124B. Additionally, each bracket 126 is further attachable to one of the forward crossbar 116A or the rearward crossbar 116B to couple the mounting plate 122 to the landing skid assembly 110. As shown, each bracket 126 includes a rail engagement portion 128 and a crossbar engagement portion 130. The rail engagement portion 128 is configured to engage with and facilitate secure attachment to an end of one of the first rail 124A or the second rail 124B. Similarly, the crossbar engagement portion 130 is configured to engage with and facilitate secure attachment to a portion of one of the forward crossbar 116A or the rearward crossbar 116B. In some examples one or both of the rail engagement portion 128 and the crossbar engagement portion 130 includes a clamping mechanism that is actuatable to clamp down on the corresponding portion of the rails or crossbars. In one example, each of the rail engagement portion 128 and the crossbar engagement portion 130 includes a clamshell-type clamp, with two opposing halves, that is clampable onto and releasable from a rail or crossbar by actuating a tightening mechanism, such as a fastener, quick-release, latch, clasp, etc. In other words, according to some examples, the brackets 126 facilitate selectively releasable coupling of the auxiliary-pod mounting system 120 to the landing skid assembly 110 of the helicopter 100.

In some examples, the auxiliary-pod mounting system 120 additionally includes one or more spacers 132. For some configurations of the auxiliary-pod mounting system 120, particularly those in which the auxiliary-pod mounting system 120 is clamped to the forward crossbar 116A and the rearward crossbar 116B, over time and under certain operating conditions, the auxiliary-pod mounting system 120 may have a tendency to slide downwardly along the crossbars. The spacer 132 helps to prevent such downwardly sliding of the auxiliary-pod mounting system 120 along the crossbars by maintaining a distance between the auxiliary-pod mounting system 120 (more specifically the second rail 124B) and a corresponding skid 114.

The spacers 132 are interposed between and engage both the second rail 124B and the skid 114. Moreover, in some examples, the spacers 132 are attached to the second rail 124B, such as by fastening, welding, bonding, etc. As indicated by directional arrows in FIG. 9, in some examples, each spacer 132 includes a foot 133 that is movable toward or away from the second rail 124B to adjust and maintain the distance between the skid 114 and the second rail 124B. Adjustment of the distance between the skid 114 and the second rail 124B allows the auxiliary-pod mounting system 120 to be usable on differently configured landing skid assemblies of different helicopters if desired. Adjustment of the foot 133 can be facilitated by an adjustment mechanism of the spacer 132, which, in some example, includes one of a telescoping adjustment mechanism, a rack-and-pinion mechanism, a ratcheting mechanism, a threaded rod mechanism, and the like. In other examples, the spacers 132 are not adjustable such that the distance between the skid 114 and the second rail 124B, maintained by the spacers, is fixed.

Figure 10:
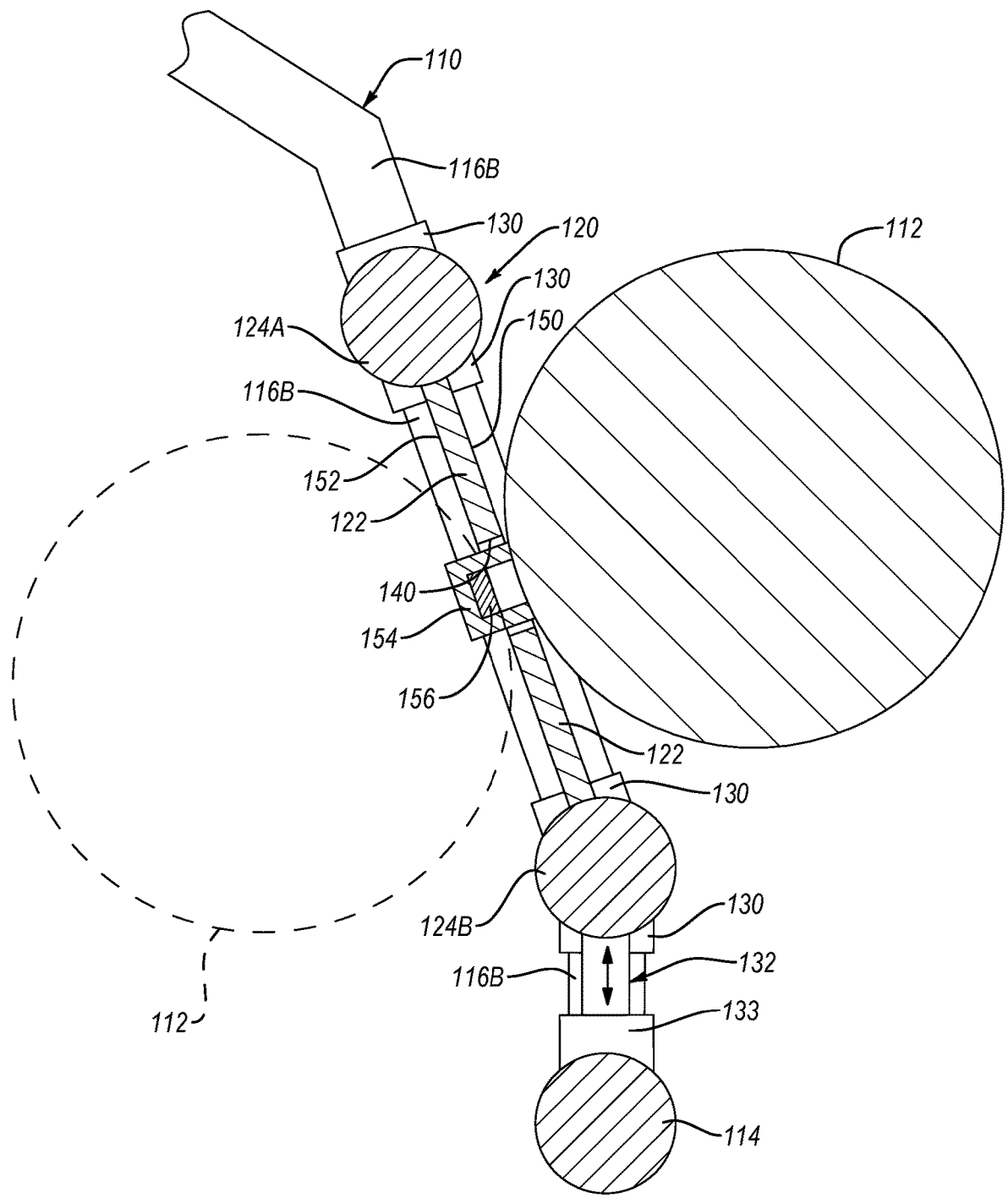
FIG. 10 is a cross-sectional front view of the landing skid assembly and auxiliary-pod mounting system of FIG. 9, with an auxiliary pod coupled to the auxiliary-pod mounting system, taken along the line 10-10 of FIG. 8, according to one or more examples of the present disclosure.

Referring now to FIGS. 8 and 10, an auxiliary pod 112 is shown mounted to the mounting plate 122 of the auxiliary-pod mounting system 120 that is mounted to the landing skid assembly 110. In FIG. 10, the auxiliary pod 112 is mounted onto the first mounting surface 150 of the mounting plate 122. The first mounting surface 150 faces outwardly relative to or away from the body 102 of the helicopter 100 and the second mounting surface 152 faces inwardly relative to or toward the body 102 of the helicopter 100. Therefore, when the auxiliary pod 112 is mounted onto the first mounting surface 150, the auxiliary pod 112 is, in effect, above the forward crossbar 116A and the rearward crossbar 116B of the landing skid assembly 110, or on the outward side of the forward crossbar 116A and the rearward crossbar 116B. The auxiliary pod 112 is mounted on the first mounting surface 150 by approaching the mounting plate 122 from the outward side of the landing skid assembly 110 and inserting the lugs 154 of the auxiliary pod 112 into corresponding apertures 140 in the mounting plate 122. Retainment assemblies 156, such as a fastener and nut assembly, each extends through the lugs 154 on the second mounting surface side of the mounting plate 122, to help retain the auxiliary pod 112 in engagement against the first mounting surface 150. The auxiliary pod 112 is releasable from engagement with the first mounting surface 150 by disengaging the retainment assemblies 156 from the lugs 154 and moving the auxiliary pod 112 away from the mounting plate 122.

Alternatively, as shown in dashed lines in FIG. 10, the auxiliary pod 112 is mounted onto the second mounting surface 152 of the mounting plate 122. Accordingly, the auxiliary-pod mounting system 120 is configured to allow mounting of an auxiliary pod 112 on either side of the mounting plate 122 (i.e., on the first mounting surface 150 or the second mounting surface 152). When the auxiliary pod 112 is mounted onto the second mounting surface 152, the auxiliary pod 112 is, in effect, below the forward crossbar 116A and the rearward crossbar 116B of the landing skid assembly 110, or on the inward side of the forward crossbar 116A and the rearward crossbar 116B. The auxiliary pod 112 is mounted on the second mounting surface 152 by approaching the mounting plate 122 from the inward side of the landing skid assembly 110 and inserting the lugs 154 of the auxiliary pod 112 into corresponding apertures 140 in the mounting plate 122. The retainment assemblies 156 each extends through the lugs 154 on the first mounting surface side of the mounting plate 122, to help retain the auxiliary pod 112 in engagement against the second mounting surface 152. The auxiliary pod 112 is releasable from engagement with the second mounting surface 152 by disengaging the retainment assemblies 156 from the lugs 154 and moving the auxiliary pod 112 away from the mounting plate 122.

Figure 11:
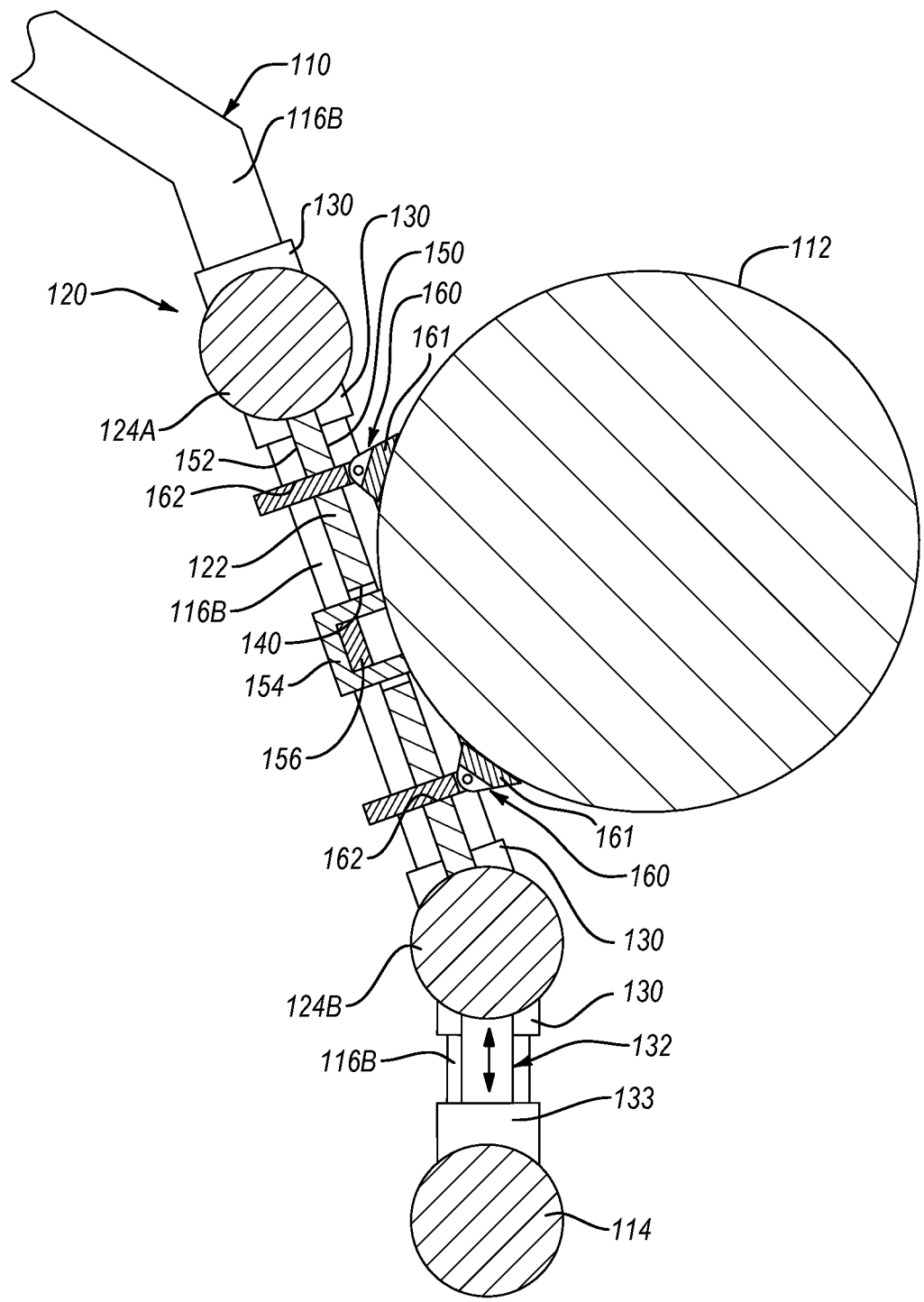
FIG. 11 is a cross-sectional front view of a landing skid assembly and auxiliary-pod mounting system of a helicopter, with an auxiliary pod coupled to the auxiliary-pod mounting system, taken along a line similar to the line 10-10 of FIG. 8, according to one or more examples of the present disclosure.

Referring to FIG. 11, in some examples, the auxiliary-pod mounting system 120 additionally includes anti-sway braces 160 that engage opposing sides of an auxiliary pod 112 mounted to the auxiliary-pod mounting system 120 to help prevent movement (e.g., swaying) during operation of the helicopter 100. Although anti-sway braces 160 are not necessary in all cases, for those situations or conditions where an auxiliary pod 112 may be susceptible to sway during operation of the helicopter 100, the anti-sway braces 160 are useful to prevent or reduce such swaying. The anti-sway braces 160 are adjustably coupled to the mounting plate 122. In the illustrated example, the anti-sway braces 160 extend at least partially through apertures 162 formed in the mounting plate 122. In one example, as shown in FIG. 7, the apertures 162 are arranged in multiple pairs with each pair spaced apart from an adjacent pair along a length of the mounting plate 122. Additionally, the apertures 162 are arranged such that one of the apertures 162 of a given pair is above the apertures 140 and the other one of the apertures 162 of the given pair is below the apertures 140. In this manner, each pair of apertures 162 effectually straddles the auxiliary pod 112.

The apertures 162 help retain and facilitate adjustment of the anti-sway braces 160. For example, the apertures 162 can be internally threaded to engage external threads of the anti-sway braces 160, such that rotation of the anti-sway braces 160 relative to the apertures 162 moves the anti-sway braces 160 toward or away from the auxiliary pod 112 (e.g., into and out of engagement with the auxiliary pod 112). In other words, the anti-sway braces 160 are adjustable to adjust a distance the anti-sway braces 160 extend from the mounting plate 122. Additionally, the anti-sway braces 160 include pivotable heads 161 that pivot to conform to the exterior surface of the auxiliary pod 112 as the anti-sway braces 160 are moved into engagement with the auxiliary pod 112.

Instead of, or in addition to, the anti-sway braces 160, in some examples, the mounting surfaces of the mounting plate 122 are contoured to complement a contour of the exterior surface of the auxiliary pod 112. According to one example, as shown in FIG. 12, the mounting plate 122 includes a first mounting surface 170 and a second mounting surface 172 that is opposite the first mounting surface 170. The first mounting surface 170 and the second mounting surface 172 are contoured or curved. In one example, the first mounting surface 170 and the second mounting surface 172 have a concave shape. In some examples, the first mounting surface 170 and the second mounting surface 172 have a semi-circular shape. In effect, the first mounting surface 170 and the second mounting surface 172 are mirrored images of each other. Because the first mounting surface 170 and the second mounting surface 172 complement the shape of the exterior surface of the auxiliary pod 112, more of the exterior surface of the auxiliary pod 112 can be in contact with the first mounting surface 170 or the second mounting surface 172, which helps stabilize the auxiliary pod 112 and promotes a reduction in sway of the auxiliary pod 112 during operation of the helicopter 100.

Figure 14:
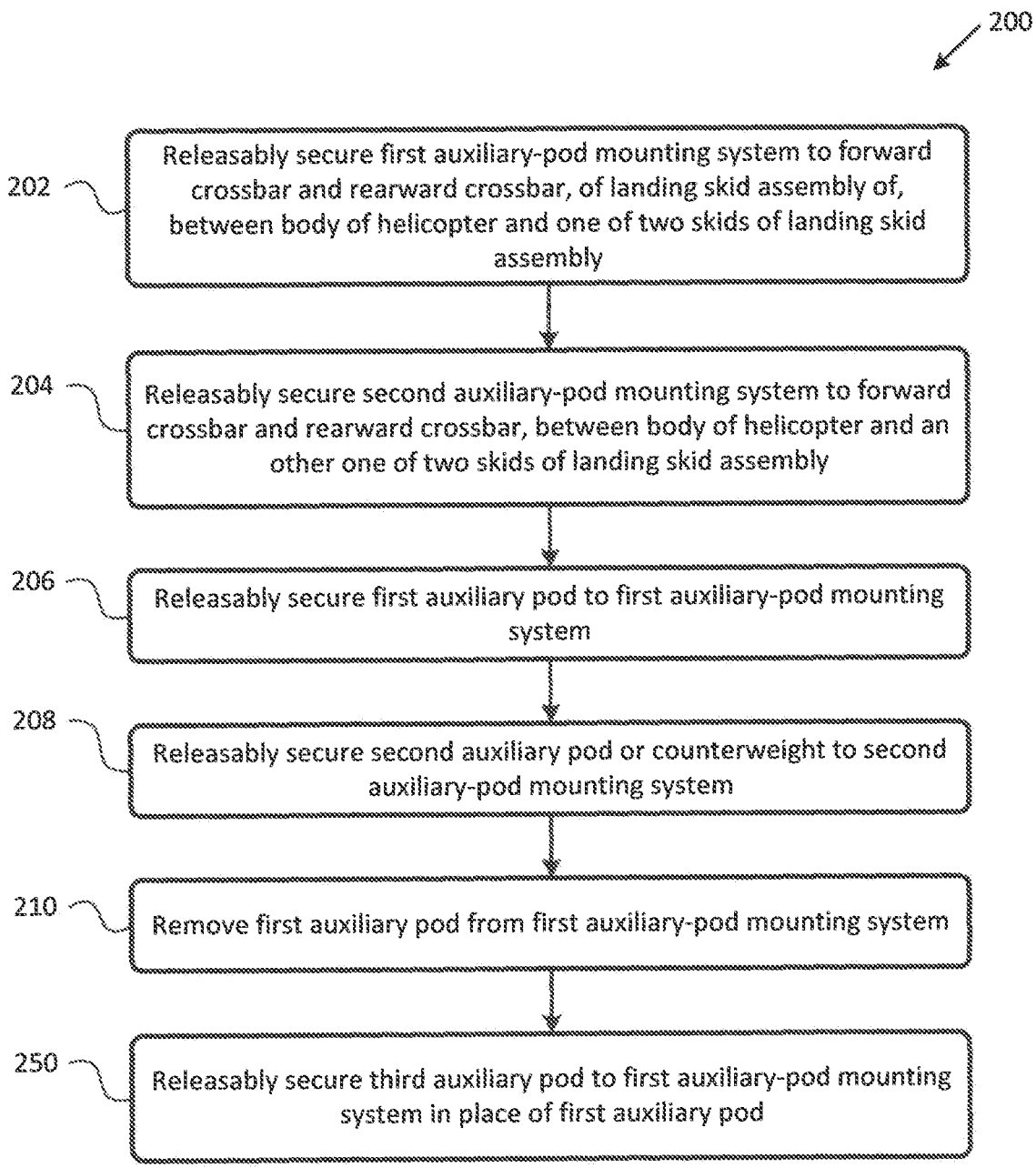
FIG. 14 is a schematic flow chart of a method of mounting an auxiliary pod to a helicopter, according to one or more examples of the present disclosure.

Referring now to FIG. 14, and according to certain examples, a helicopter 100 is shown with an auxiliary pod 112 mounted to the auxiliary-pod mounting system 120 on the left side of the landing skid assembly 110 and counterweights 174 mounted to the auxiliary-pod mounting system 120 on the right side of the landing skid assembly 110. Because an auxiliary pod 112 is not mounted to the auxiliary-pod mounting system 120 on the left side, without the counterweights 174 mounted to auxiliary-pod mounting system 120 on the right side, the helicopter 100 would be more weighted on the left side and thus would be unevenly balanced, causing an adverse effect on operation of the helicopter 100.

More than one counterweight 174 could be mounted to the auxiliary-pod mounting system 120. For example, multiple counterweights 174 attached to each other could be mounted to the auxiliary-pod mounting system 120. Generally, the weight of the counterweight(s) 174 should be equal or close to the weight of the auxiliary pod 112 to balance the weight of the helicopter 100. In view of the various types of auxiliary pods 112, with different weights, that are mountable to one of the auxiliary-pod mounting systems 120, in one example, a selectively changeable number of counterweights 174 of a counterweight set can be mounted to the other auxiliary-pod mounting system 120 to accommodate the variable weights of the auxiliary pods 112. For example, for lighter auxiliary pods 112, a lesser number (e.g., one) of matching counterweights 174 of a set can be mounted to the other auxiliary-pod mounting system 120. In contrast, for heavier auxiliary pods 112, a greater number (e.g., two or more) of matching counterweights 174 of the set can be mounted to the other auxiliary-pod mounting system 120. Alternatively, the set can include counterweights 174 of different weights, such that a lighter counterweight of the set can be used to counter the weight of a lighter auxiliary pod 112 or a heavier counterweight of the set can be used to counter the weight of a heavier auxiliary pod 112.

Figure 13:
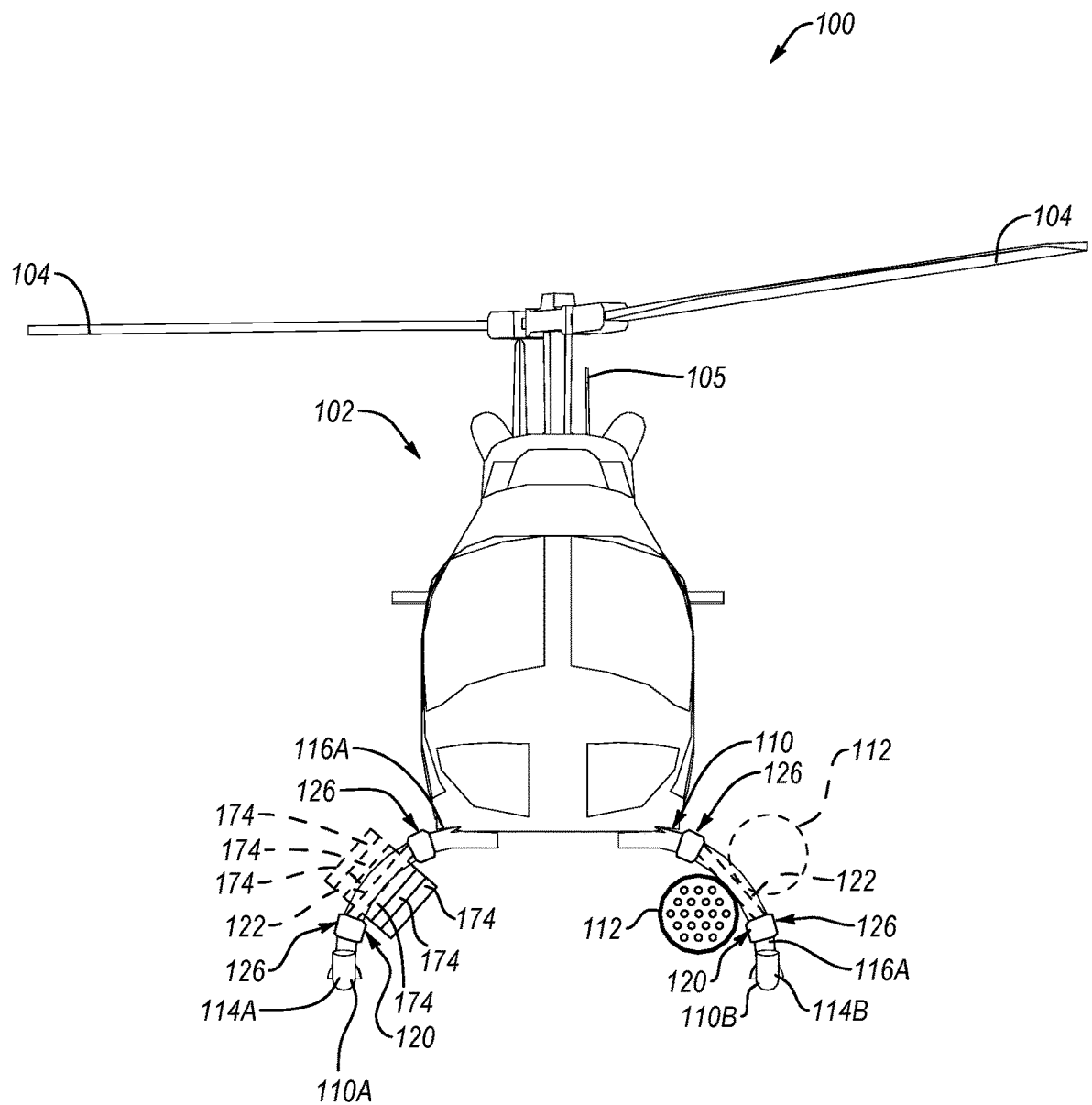
FIG. 13 is a front view of a helicopter, according to one or more examples of the present disclosure.

Although, in FIG. 13, the auxiliary pod 112 and counterweights 174 are shown mounted to the auxiliary-pod mounting systems 120 on the downward side of the landing skid assembly 110, as indicated in dashed lines and following the mounting procedure outlined above, the auxiliary pod 112 and counterweights 174 are mounted to the auxiliary-pod mounting systems 120 on the upward side of the landing skid assembly 110 in other examples. It is also recognized that although the auxiliary pod 112 is mounted to the auxiliary-pod mounting systems 120 on the left side of the landing skid assembly 110 and the counterweights 174 are mounted to the auxiliary-pod mounting systems 120 on the right side of the landing skid assembly 110, in other examples, the auxiliary pod 112 is mounted to the auxiliary-pod mounting systems 120 on the right side of the landing skid assembly 110 and the counterweights 174 are mounted to the auxiliary-pod mounting systems 120 on the left side of the landing skid assembly 110.

In view of the above disclosure of the auxiliary-pod mounting system 120, and referring to FIG. 14, one example of a method 200 of mounting the auxiliary pod 112 to the helicopter 100 includes (block 202) releasably securing a first auxiliary-pod mounting system 120 to the forward crossbar 116A and the rearward crossbar 116B between the body 102 of the helicopter 100 and one of the two skids 114 of the landing skid assembly 110. The method 200 also includes (block 204) releasably securing a second auxiliary-pod mounting system 120 to the forward crossbar 116A and the rearward crossbar 116B between the body 102 of the helicopter 100 and the other one of the two skids 114 of the landing skid assembly 110. The method 200 further includes (block 206) releasably securing a first auxiliary pod to the first auxiliary-pod mounting system 120 and (block 208) releasably securing a second auxiliary pod or a counterweight 174 to the second auxiliary-pod mounting system 120. The first auxiliary pod is a different type or the same type of auxiliary pod as the second auxiliary pod.

According to a further example, the method 200 additionally includes (block 210) removing the first auxiliary pod from the first auxiliary-pod mounting system 120 and (block 212) releasably securing a third auxiliary pod to the first auxiliary-pod mounting system 120 in place of the first auxiliary pod. The third auxiliary pod is a different type of auxiliary pod than the first auxiliary pod in some examples.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An auxiliary-pod mounting system for mounting an auxiliary pod to a landing skid assembly of a helicopter, wherein the landing skid assembly comprises a forward crossbar, a rearward crossbar, and skids coupled to the forward crossbar and the rearward crossbar, and the auxiliary-pod mounting system comprises:
   a first rail;
   a second rail, spaced apart from the first rail;
   a mounting plate, interposed between and coupled to the first rail and the second rail, wherein the mounting plate comprises pod engagement features configured to engage the auxiliary pod and to secure the auxiliary pod to the mounting plate; and
   a plurality of brackets configured to couple the first rail and the second rail to the forward crossbar and the rearward crossbar of the landing skid assembly of the helicopter.

2. The system according to claim 1, wherein:
   the auxiliary pod comprises lugs, spaced apart from each other by a first distance; and
   the pod engagement features of the mounting plate comprise apertures, spaced apart from each other by the first distance and configured to receive the lugs of the auxiliary pod.

3. The system according to claim 2, wherein:
   the apertures comprise a pair of first apertures spaced apart from each other by the first distance;
   the apertures further comprise a pair of second apertures spaced apart from each other by a second distance, different than the first distance;
   the pair of second apertures are configured to receive lugs of a second auxiliary pod; and
   the lugs of the second auxiliary pod are spaced apart from each other by the second distance.

4. The system according to claim 1, further comprising a spacer, coupled to the second rail, positionable between the second rail and one of the skids, and configured to maintain an adjustable distance between the second rail and the one of the skids when the first rail and the second rail are coupled to the forward crossbar and the rearward crossbar by the plurality of brackets.

5. The system according to claim 1, further comprising anti-sway braces, coupled to the mounting plate and each configured to engage a corresponding one of opposing sides of the auxiliary pod.

6. The system according to claim 5, wherein the anti-sway braces are adjustable to adjust a distance the anti-sway braces extend from the mounting plate.

7. The system according to claim 5, wherein the anti-sway braces comprise multiple pairs of anti-sway braces, spaced apart from each other along the mounting plate.

8. The system according to claim 1, wherein each one of the brackets is configured to releasably clamp onto one of the forward crossbar or the rearward crossbar.

9. The system according to claim 1, wherein:
   the mounting plate comprises a flat mounting surface; and
   the auxiliary pod is engaged against the flat mounting surface when the auxiliary pod is secured to the mounting plate.

10. The system according to claim 1, wherein:
    the mounting plate comprises a contoured mounting surface;
    a contour of the contoured mounting surface complements a contour of the auxiliary pod; and
    the auxiliary pod is engaged against the contoured mounting surface when the auxiliary pod is secured to the mounting plate.

11. The system according to claim 1, wherein the mounting plate is configured such that, when the first rail and the second rail are coupled to the forward crossbar and the rearward crossbar of the landing skid assembly of the helicopter by the plurality of brackets, an entirety of the mounting plate is interposed between the forward crossbar and the rearward crossbar.

12. The system according to claim 1, wherein:
    the mounting plate comprises a first mounting surface and a second mounting surface, opposite the first mounting surface;
    when the first rail and the second rail are coupled to the forward crossbar and the rearward crossbar of the landing skid assembly of the helicopter by the plurality of brackets, the first mounting surface faces outwardly relative to the helicopter and the second mounting surface faces inwardly relative to the helicopter; and
    the pod engagement features are configured to engage the auxiliary pod with the auxiliary pod above the forward crossbar and the rearward crossbar or below the forward crossbar and the rearward crossbar and to secure the auxiliary pod against either the first mounting surface or the second mounting surface.

13. The system according to claim 12, wherein the first mounting surface and the second mounting surface are flat.

14. The system according to claim 12, wherein the first mounting surface and the second mounting surface are contoured.

15. A helicopter, comprising:
    a body;
    rotors, rotatably coupled to the body at a top portion of the body;
    a landing skid assembly, fixedly coupled to the body at a bottom portion of the body, wherein the landing skid assembly comprises a forward crossbar, a rearward crossbar, and skids coupled to the forward crossbar and the rearward crossbar;

auxiliary-pod mounting systems, each coupled to the forward crossbar and the rearward crossbar between a corresponding one of the skids and the body;

a first auxiliary pod secured to one of the auxiliary-pod mounting systems; and one of a second auxiliary pod or a counterweight secured to an other one of the auxiliary-pod mounting system, wherein each one of the auxiliary-pod mounting systems comprises:

a first rail;

a second rail, spaced apart from the first rail;

a mounting plate, interposed between and coupled to the first rail and the second rail, wherein the mounting plate comprises pod engagement features configured to engage a corresponding one of the first auxiliary pod or the one of the second auxiliary pod or the counterweight to secure the corresponding one of the first auxiliary pod or the one of the second auxiliary pod or the counterweight to the mounting plate; and a plurality of brackets configured to couple the first rail and the second rail to the forward crossbar and the rearward crossbar of the landing skid assembly of the helicopter.

16. The helicopter according to claim 15, wherein the second auxiliary pod is secured to the other one of the auxiliary-pod mounting systems.

17. The helicopter according to claim 15, wherein the counterweight is secured to the other one of the auxiliary-pod mounting systems.

18. The helicopter of claim according to claim 15, wherein each one of the auxiliary-pod mounting systems further comprises a spacer, coupled to the second rail of the corresponding auxiliary-pod mounting system, positionable between the second rail of the corresponding auxiliary-pod mounting system and a corresponding one of the skids, and configured to maintain an adjustable distance between the second rail of the corresponding auxiliary-pod mounting system and the corresponding one of the skids.

19. A method of mounting an auxiliary pod to a helicopter, comprising:

releasably securing a first auxiliary-pod mounting system to a forward crossbar and a rearward crossbar, of a landing skid assembly of the helicopter, between a body of the helicopter and one of two skids of the landing skid assembly by coupling a first rail and a second rail to the forward crossbar and to the rearward crossbar on a first side of the helicopter and by coupling a first mounting plate to the first rail and to the second rail such that the mounting plate is interposed between the first rail and the second rail;

releasably securing a second auxiliary-pod mounting system to the forward crossbar and the rearward crossbar, of the landing skid assembly of the helicopter, between the body of the helicopter and an other one of the two skids of the landing skid assembly by coupling a third rail and a fourth rail to the forward crossbar and to the rearward crossbar on a second side of the helicopter, opposite the first side of the helicopter, and by coupling a second mounting plate to the third rail and to the fourth rail such that the second mounting plate is interposed between the third rail and the fourth rail;

releasably securing a first auxiliary pod to the first auxiliary-pod mounting system; and releasably securing a second auxiliary pod or a counterweight to the second auxiliary-pod mounting system.

20. The method according to claim 19, further comprising:

removing the first auxiliary pod from the first auxiliary-pod mounting system; and releasably securing a third auxiliary pod to the first auxiliary-pod mounting system in place of the first auxiliary pod.

\* \* \* \* \*